(12) United States Patent
Tsai et al.

(10) Patent No.: US 11,105,403 B2
(45) Date of Patent: Aug. 31, 2021

(54) BALL SCREW

(71) Applicant: HIWIN TECHNOLOGIES CORP., Taichung (TW)

(72) Inventors: Cheng-Yu Tsai, Taichung (TW); Yu-Wei Chuang, Taichung (TW); Jhao-En Wei, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 251 days.

(21) Appl. No.: 16/561,032

(22) Filed: Sep. 5, 2019

(65) Prior Publication Data

US 2021/0071715 A1 Mar. 11, 2021

(51) Int. Cl.
*F16H 25/20* (2006.01)
*F16C 11/00* (2006.01)

(52) U.S. Cl.
CPC .............. *F16H 25/20* (2013.01); *F16C 11/00* (2013.01)

(58) Field of Classification Search
CPC .. F16H 25/20; F16H 25/2418; F16H 57/0497; F16H 2025/249; F16C 41/00
See application file for complete search history.

(56) References Cited

U.S. PATENT DOCUMENTS

| 8,336,416 | B2 | 12/2012 | Chiu | |
|---|---|---|---|---|
| 2005/0255186 | A1* | 11/2005 | Hiraga | F16H 25/24 425/542 |
| 2008/0257080 | A1* | 10/2008 | Singh | F16H 57/01 74/89.23 |
| 2009/0260463 | A1* | 10/2009 | Fukano | F16H 57/0497 74/89.33 |
| 2012/0042741 | A1* | 2/2012 | Jacob | F16H 57/0464 74/89.44 |
| 2014/0000395 | A1* | 1/2014 | Schwarzbach | F16H 57/043 74/89.44 |

(Continued)

FOREIGN PATENT DOCUMENTS

| CN | 203604564 U | 5/2014 |
|---|---|---|
| DE | 101 19 226 A1 | 12/2002 |

(Continued)

OTHER PUBLICATIONS

"Drucksensor" from Wikipedia URL: https://web.archive.org/web/20190514085423/https://de.wikipedia.org/wiki/Drucksensor, Jul. 21, 2005.

*Primary Examiner* — David M Fenstermacher
(74) *Attorney, Agent, or Firm* — Winston Hsu

(57) ABSTRACT

A ball screw adapted to detecting coolant liquid includes a screw, a nut, a plurality of sealing members, a sensor, a signal processing unit and a cover. The nut includes a main body and an end surface, and a through-hole and a flow channel are disposed on the main body. The nut is threadedly disposed on the screw via the through-hole. A plurality of openings are disposed on the end surface, and the openings communicate with the flow channel. The sealing members are disposed in the plurality of openings. The sensor is disposed on one of the sealing members to detect a pressure of the coolant liquid and output an original signal. The signal processing unit is electrically connected to the sensor to receive the original signal and convert the original signal to a digital signal. The cover is disposed on the sensor and fixed to the nut.

7 Claims, 8 Drawing Sheets

(56) References Cited

U.S. PATENT DOCUMENTS

| | | | | |
|---|---|---|---|---|
| 2015/0096397 A1* | 4/2015 | Jeng | ............... | G01L 5/0061 |
| | | | | 74/424.82 |
| 2016/0356367 A1* | 12/2016 | Hogberg | ............ | F16H 57/0406 |
| 2017/0356532 A1* | 12/2017 | Tonaka | ................ | F01D 17/10 |
| 2018/0038462 A1* | 2/2018 | Daniel | ................ | F16H 25/24 |
| 2019/0376586 A1* | 12/2019 | Shimizu | ............ | F16H 25/2204 |
| 2021/0071715 A1* | 3/2021 | Tsai | ................ | F16H 25/20 |
| 2021/0116018 A1* | 4/2021 | Vermande | ......... | F16H 57/0464 |
| 2021/0116068 A1* | 4/2021 | Vermande | ............. | F16N 7/385 |

FOREIGN PATENT DOCUMENTS

| | | |
|---|---|---|
| DE | 10 2009 032 591 A1 | 1/2011 |
| ES | 2 224 813 A1 | 3/2005 |
| JP | 2-250746 A | 10/1990 |
| TW | I572797 B | 3/2017 |

* cited by examiner

BALL SCREW

BACKGROUND OF THE INVENTION

1. Field of the Invention

The present invention relates to a ball screw, and more particularly, to a ball screw capable of detecting a flow rate or a pressure of coolant liquid through a sensor disposed on a sealing member.

2. Description of the Prior Art

Screws are common mechanical devices in industry. In general, when a screw and a nut disposed thereon work, relative motion between each other generates much heat. Therefore, operators usually pour lubricating fluid in advance on the screw to reduce friction among components, or set up flow channels in the nut which coolant liquid flows in to transfer the heat. However, if a quantity of the coolant liquid is not enough, the heat generated cannot be transferred in time and temperature of the components may rise continuously. On the other hand, if the quantity of the coolant liquid is too much, flow tubes may break and the splashed liquid may wet the other component needed to maintain dry. Consequently, to ensure an instant flow rate of the coolant liquid is an issue.

To solve the problem mentioned, there are designs with a sensor disposed in the nut. For example, Taiwanese patent with publication number TW 1572797 discloses a dual-nut ball screw having preload sensing function by disposing a ring-shaped force sensor at the bottom section of a ring-shaped deformable platform. However, it is difficult to manufacture the ring-shaped force sensor or the ring-shaped deformable platform. The manufacturing cost is thus increased.

SUMMARY OF THE INVENTION

The present invention provides a ball screw capable of detecting an instant flow rate or an instant pressure by disposing a sensor on a sealing member. The sensor does not need to undergo complicated manufacturing, and the industrial cost can be saved.

According to an embodiment of the present invention, the ball screw adapted to detecting coolant liquid comprises a screw, a nut, a plurality of sealing members, a sensor, a signal processing unit and a cover. The nut comprises a main body and an end surface, and a through-hole and a flow channel are disposed on the main body. The nut is threadedly disposed on the screw via the through-hole. A plurality of openings are disposed on the end surface, and the openings communicate with the flow channel. The sealing members are disposed in the plurality of openings. The sensor is disposed on one of the sealing members to detect a pressure of the coolant liquid and output an original signal. The signal processing unit is electrically connected to the sensor to receive the original signal and convert the original signal to a digital signal. The cover is disposed on the sensor and fixed to the nut.

Preferably, the sealing member further comprises a protruding portion, and the sensor is disposed on the protruding portion.

Preferably, an orthogonal projected area of the protruding portion on the cover is 60% to 70% of an orthogonal projected area of the sensor on the cover.

Preferably, the ball screw further comprises a control unit and a memory unit. The sensor, the signal processing unit, the control unit and the memory unit are electrically connected to each other. The signal processing unit outputs the digital signal to the control unit, and the memory unit stores the digital signal.

Preferably, the ball screw further comprises an indication unit. The indication unit is electrically connected to the control unit. When an error between the digital signal and a predetermined signal does not exceed a ±20% threshold of the predetermined signal, the indication unit outputs a first indicating signal. When the error is from the 20% threshold to a 40% threshold or from the −20% threshold to a −40% threshold of the predetermined signal, the indication unit outputs a second indicating signal. When the error exceeds the ±40% threshold of the predetermined signal, the indication unit outputs a third indicating signal.

Preferably, the sensor is a piezoresistive sensor.

Preferably, the plurality of sealing members are symmetrically arranged along a circumstantial direction of the nut, and a surface of the cover is coplanar with the end surface.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a flow chart of procedures that the ball screw in FIG. 7 detects coolant liquid through.

DETAILED DESCRIPTION

The above and other technical features, characteristics and functions will be clearly presented in the following description with the drawings. It is noted that the following directional terms such as up, down, left, right, front and rear are merely for ease of comprehension to the drawings. Therefore, the directional terms used are configured to illustrate and not to restrict the present invention. In addition, identical components or similar numeral references are used for identical components or similar components in the following embodiments.

Figure 1:
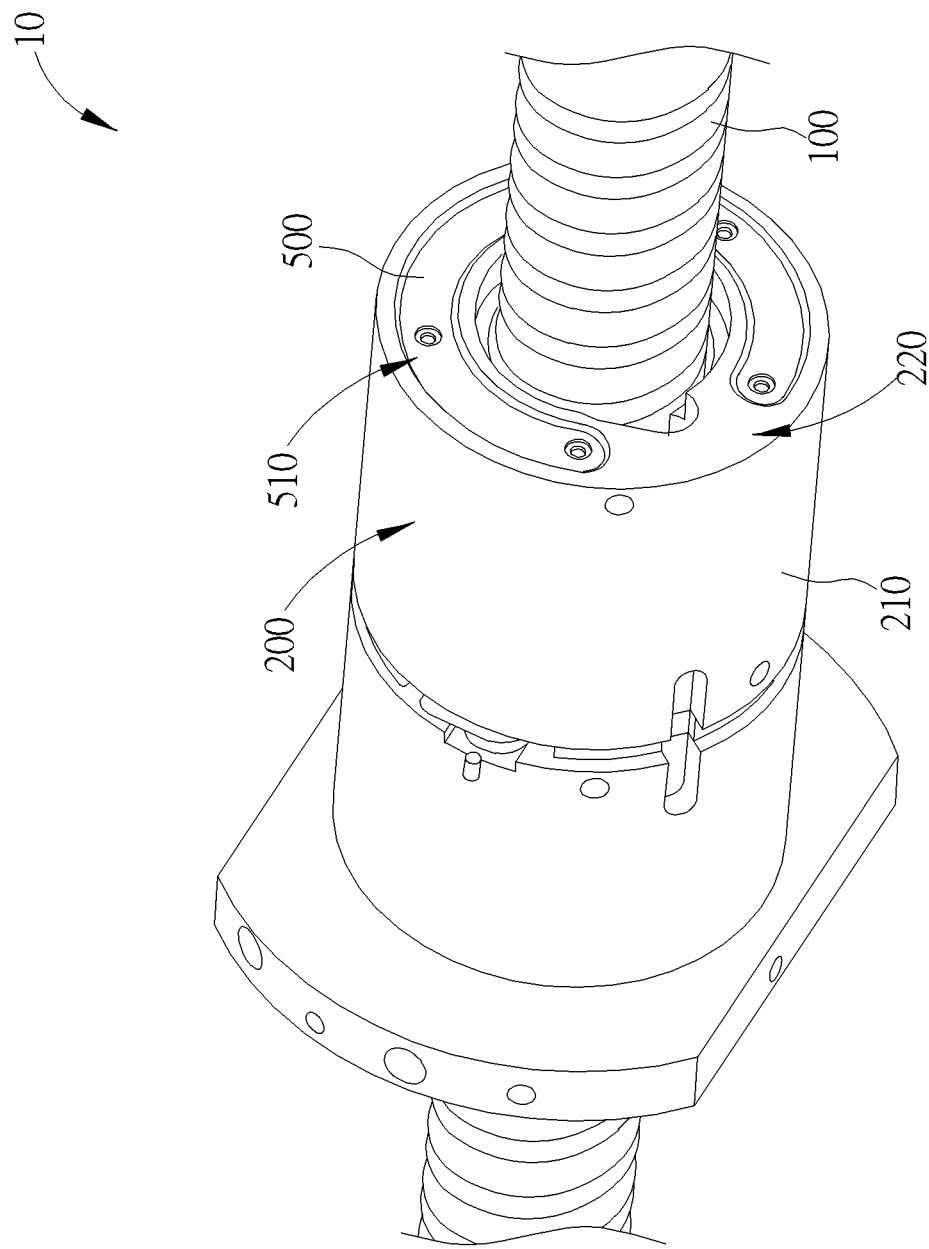
FIG. 1 is a perspective diagram of a ball screw according to an embodiment of the present invention.
Figure 2:
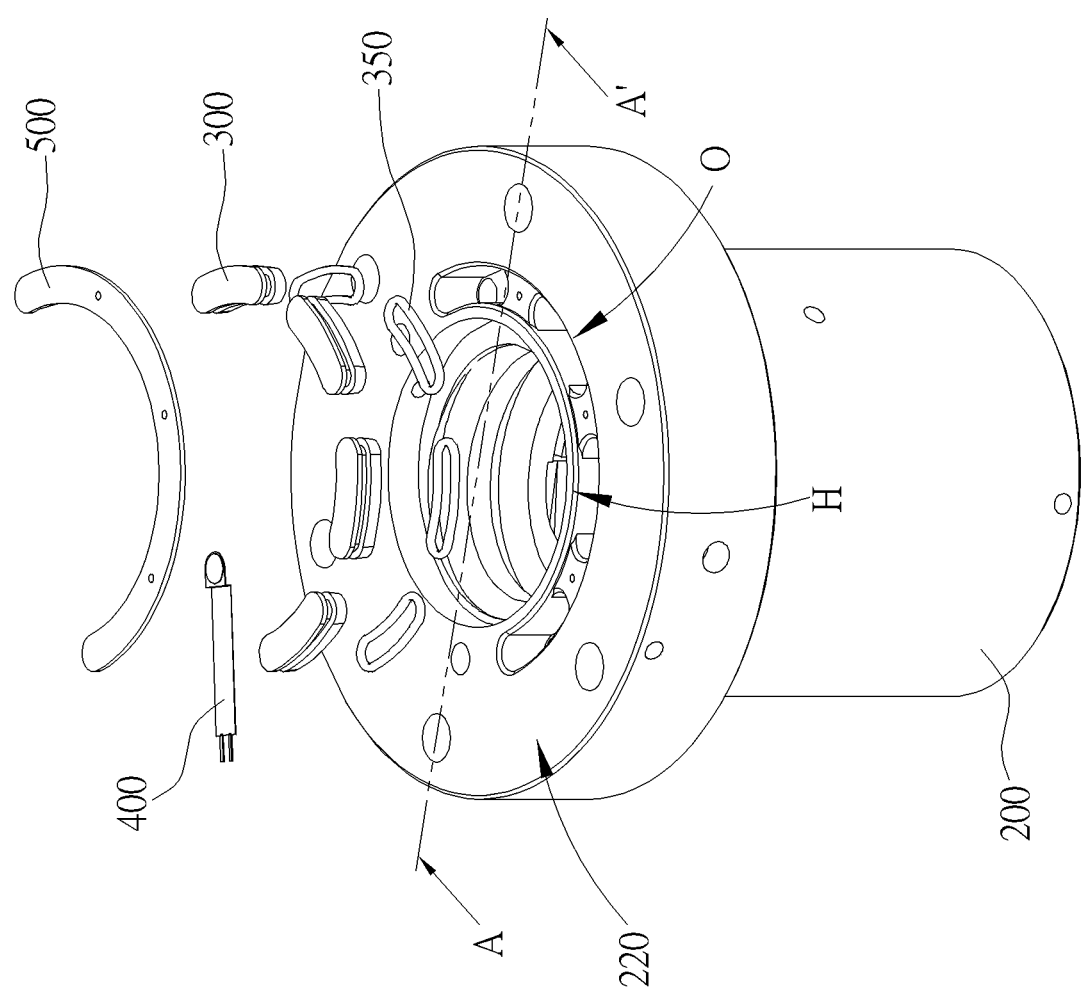
FIG. 2 is an exploded diagram of partial components of the ball screw in FIG. 1.

FIG. 1 is a perspective diagram of a ball screw according to an embodiment of the present invention. FIG. 2 is an exploded diagram of partial components of the ball screw in FIG. 1. Please refer to FIG. 1 and FIG. 2, the ball screw 10 in the embodiment comprises a screw 100, a nut 200, a plurality of sealing members 300, a sensor 400 and a cover 500. The nut 200 comprises a main body 210 and an end surface 220. A through-hole H and a flow channel are disposed on the main body 210. A plurality of openings O are disposed on the end surface 220, and the openings O communicate with the flow channel. The sealing members 300 are disposed in the openings O. The sensor 400 is disposed on one of the sealing members 300, and the cover 500 is disposed on the sensor 400 and fixed to the nut 200.

Particularly, the nut 200 is threadedly disposed on the screw 100 via the through-hole H. Since threads are disposed inside the through-hole H, the nut 200 is able to move relative to the screw 100 via the threads inside the through-hole H. During the relative motion much heat is generated, so coolant liquid is disposed in the flow channel of the nut 200 to decrease a temperature of the nut 200. Since the openings O communicate with the flow channel, and the sealing members 300 are disposed in the openings O, pressure generated according to the flowing of the coolant liquid will directly react to the sealing members 300. As shown in FIG. 2, shapes of the sealing members 300 are corresponding to those of the openings O. Besides, to prevent leakage of the coolant liquid by incomplete sealing with the sealing members 300, a washer 350 is disposed on the sealing member 300 to combine the sealing member 300 with the opening O more perfectly. After the arrangement of the sealing members 300, in order to detect flux of the coolant liquid, the sensor 400 is disposed on one of the sealing members 300 to sense the pressure reacted from the coolant liquid on the sealing member 300. After the arrangement of the sensor 400, the cover 500 is disposed on the sensor 400 and fixed to the nut 200 through screwing members such as bolts.

As shown in FIG. 2, it is noted that the sealing members 300 in the embodiment are arranged symmetrically along a circumstantial direction of the nut 200. The disposition can reduce variation of the pressure of the coolant liquid by various sealing due to different sealing positions.

Figure 3:
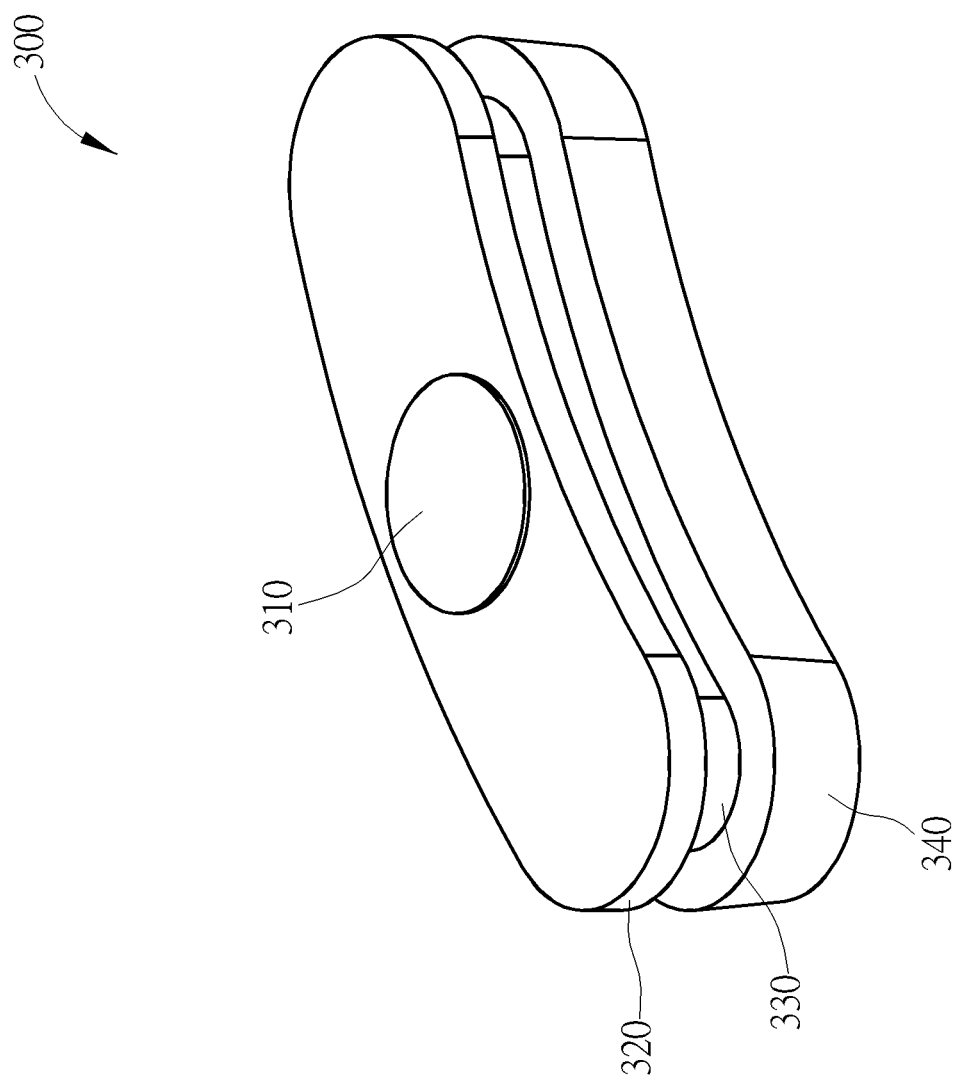
FIG. 3 is a perspective diagram of a sealing member in FIG. 2.
Figure 4:
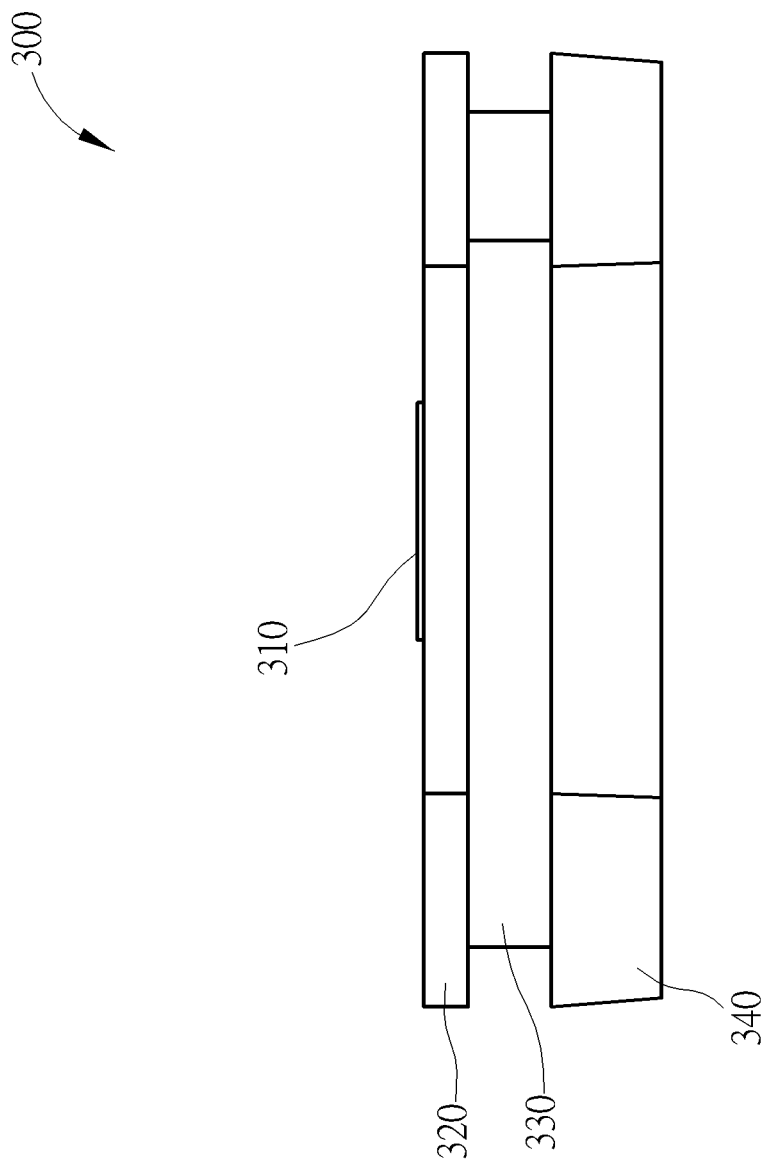
FIG. 4 is a side view of the sealing member in FIG. 3.

FIG. 3 is a perspective diagram of the sealing member in FIG. 2. FIG. 4 is a side view of the sealing member in FIG. 3. Please refer to FIG. 3 and FIG. 4. In the embodiment, each of the sealing members 300 has a cover portion 320, a connecting portion 330 and a sealing portion 340. The connecting portion 330 connects the cover portion 320 and the sealing portion 340, and the sealing member 300 is disposed in the opening O with the sealing portion 340 toward the opening O. When the sealing members 300 are disposed in the openings O, the washers 350 are disposed between the cover portion 320 and the sealing portion 340. Thereby, a dimension of the connecting portion 330 is designed slightly less than dimensions of the cover portion 320 and the sealing portion 340, so the washer 350 set up on the connecting portion 330 between the cover portion 320 and the sealing portion 340 will not escape from the sealing member 300 due to sliding. In other words, after the arrangement of the sealing members 300, an orthogonal projected area of the connecting portion 330 on the cover 500 is less than an orthogonal projected area of the cover portion 320 and an orthogonal projected area the sealing portion 340 on the cover 500.

As shown in FIG. 4, it is noted that an outer peripheral surface of the sealing portion 340 is designed as a conical surface. Therefore, when a flow speed of the coolant liquid increases, the sealing members 300 can attach to walls of the openings O closely and provide a better leak proof effect. The details will be illustrated hereinafter.

In the embodiment, the sensor 400 is a piezoresistive sensor capable of detecting the pressure from the sealing member 300 and generates a corresponding electric resistant signal. To make transmission of the pressure reacted on the sealing member 300 from the coolant liquid to the sensor 400 more effective, in the embodiment, the sealing member 300 with the sensor 400 further comprises a protruding portion 310, and the sensor 400 is disposed on the protruding portion 310. Based on experimental results, when a dimension of the protruding portion 310 is designed as 60% to 70% of a dimension of the sensor 400, an effective sensing area of the sensor 400 is satisfied well and sensitivity and precision of the sensing rise. Therefore, after the arrangement of the sealing member 300 and the sensor 400, an orthogonal projected area of the protruding portion 310 on the cover 500 is 60% to 70% of an orthogonal projected area of the sensor 400 on the cover 500. By the disposition, a better sensing result with respect to contacting the sensor 400 by an entire surface of the cover portion 320 is achieved.

Figure 5:
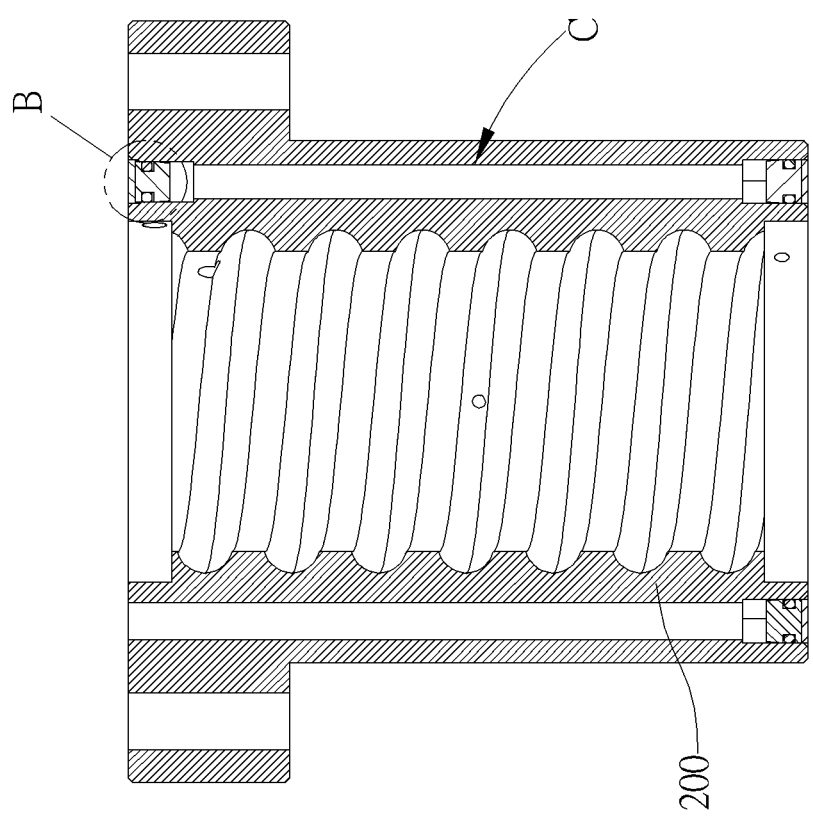
FIG. 5 is a cross-sectional view of the ball screw along a cross section A-A in FIG. 2.
Figure 6:
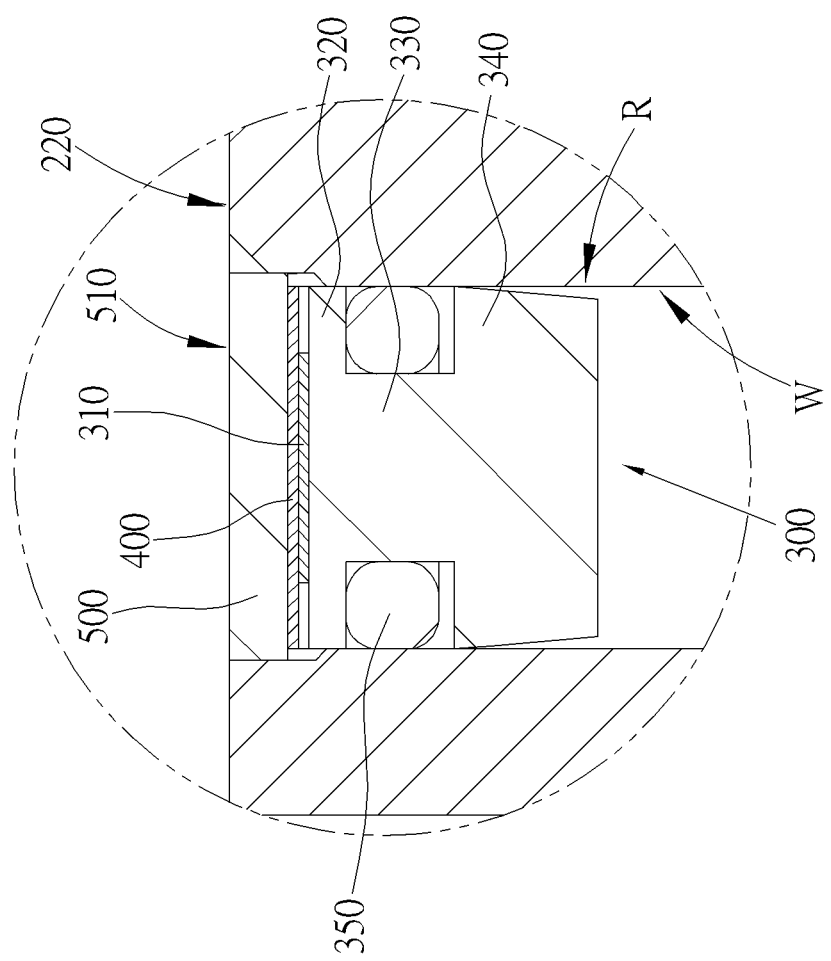
FIG. 6 is an enlarged diagram of a zone B in FIG. 5.

To illustrate the disposition of the sealing member 300 and the sensor 400 more clearly, please refer to FIG. 5 and FIG. 6. FIG. 5 is a cross-sectional view of the ball screw along a cross section A-A in FIG. 2. FIG. 6 is an enlarged diagram of a zone B in FIG. 5. As shown in FIG. 5 and FIG. 6, the flow channel C communicates with the opening O. The sealing member 300 and the sensor 400 are disposed in the opening O, and the sensor 400 is disposed between the protruding portion 310 and the cover 500. Thereby, when the coolant liquid flows and generates the pressure reacted on the sealing member 300, since the size of the protruding portion 310 is corresponding to that of the effective sensing area of the sensor 400, the sensor 400 is able to detect the pressure of the liquid and slight variation of the flow speed instantly. Moreover, since the sensor 400 is a piezoresistive sensor and simply stacks with the sealing member 300, complicated manufacturing of the sensor 400 is not needed. Therefore, time and cost can be saved during mass production in industry.

It is noted that since the outer peripheral surface of the sealing portion 340 is designed as a conical surface, when the sealing members 300 are disposed in the openings O, a clearance R is between the sealing portion 340 and the wall W of the corresponding opening O, and the size of the clearance R gradually decreases along a direction from the sealing portion 340 to the cover portion 320. Thereby, when the flow speed of the coolant liquid is increased, a part of the sealing portion 340 near the connecting portion 330 will expand outward to increase a contact area between the outer peripheral surface of the sealing portion 340 and the wall W, so as to achieve the leak proof effect indeed.

On the other hand, as shown in FIG. 6, after the arrangement of each component, the surface 510 of the cover 500 is coplanar with the end surface 220. Therefore, the smoothness of overall appearance of the ball screw 10 is increased, and impacts among the components are prevented.

Figure 7:
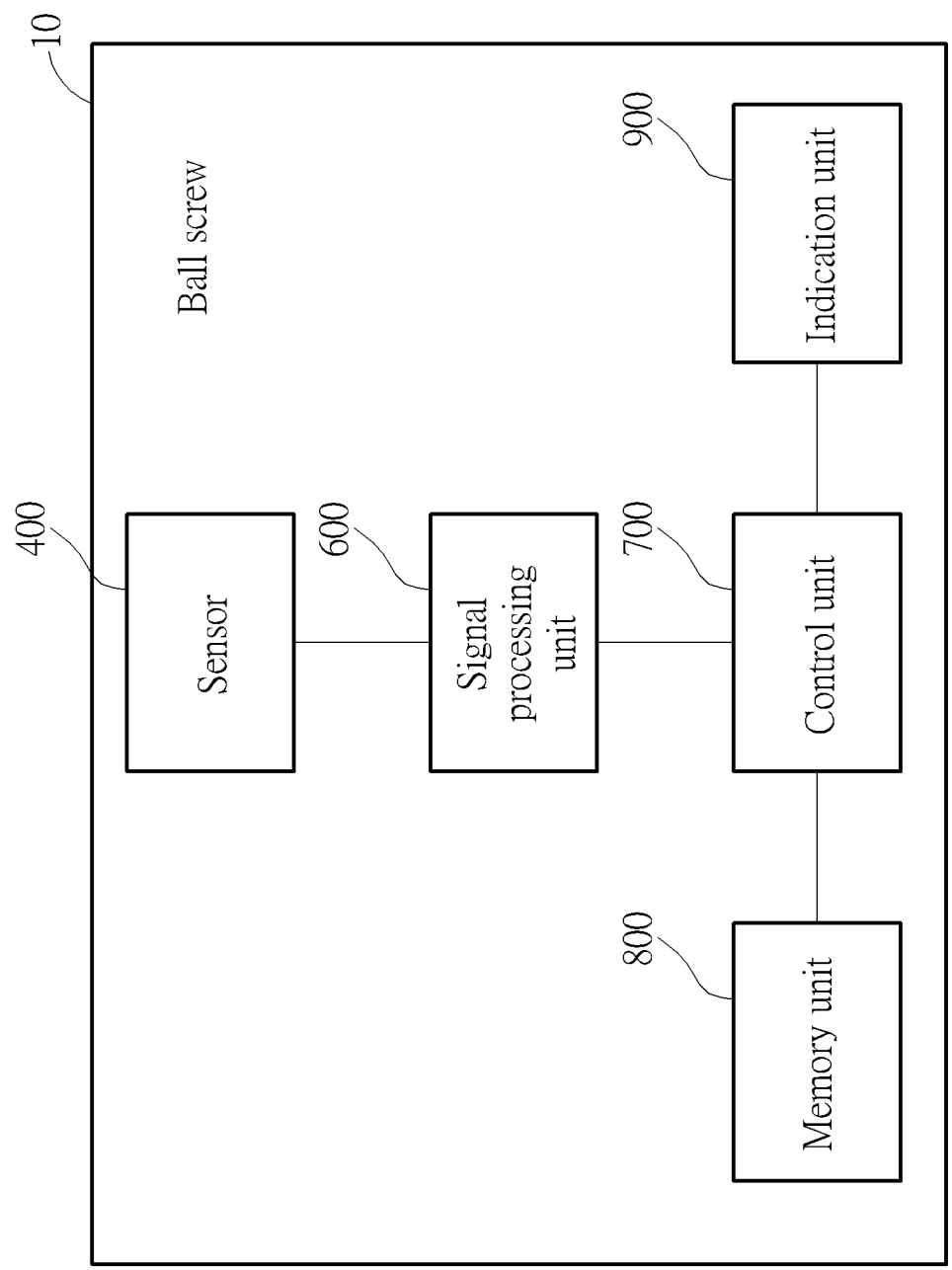
FIG. 7 is a block diagram of electric components of the ball screw in FIG. 1.
Figure 8:
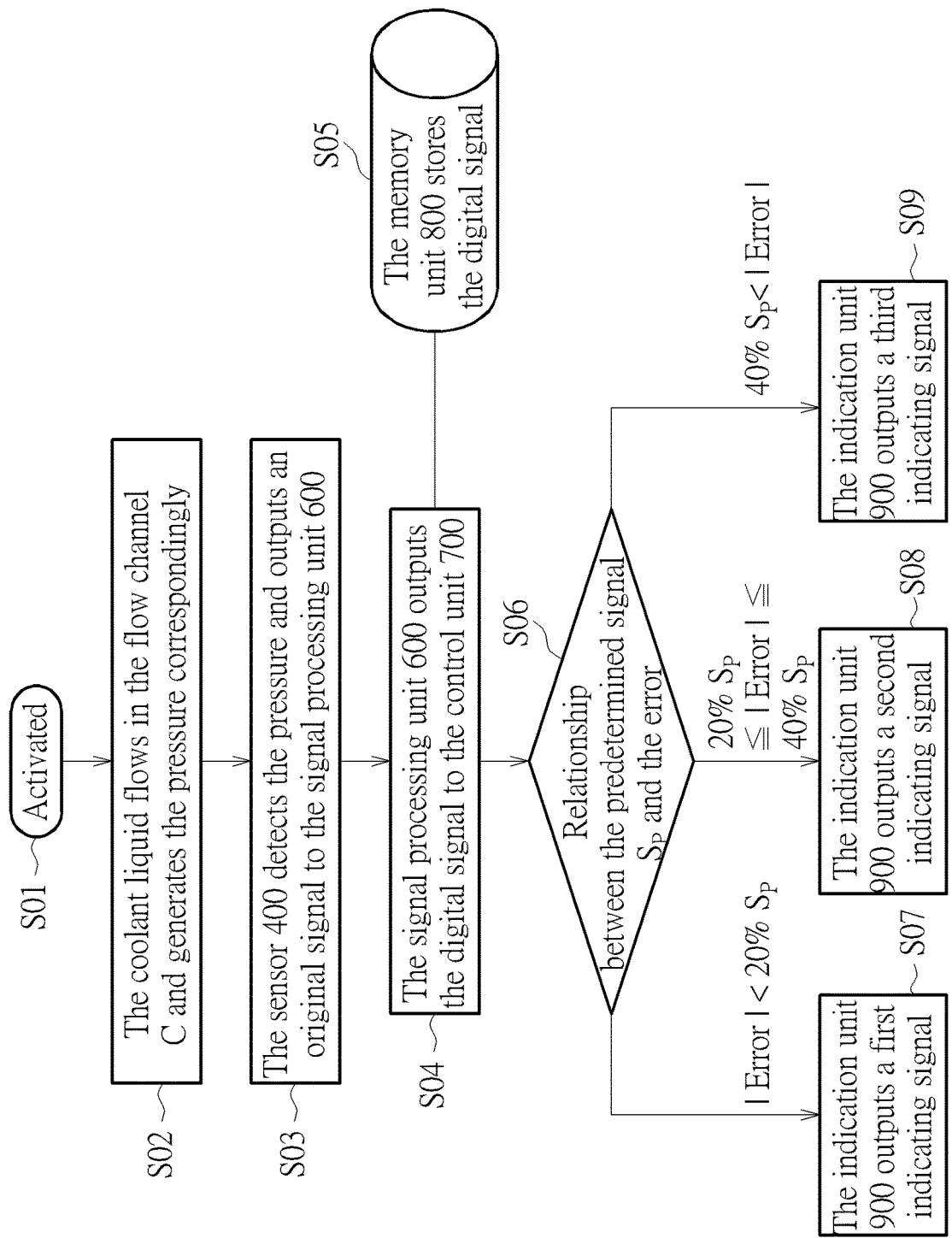

FIG. 7 is a block diagram of electric components of the ball screw in FIG. 1. FIG. 8 is a flow chart of procedures that the ball screw in FIG. 7 detects coolant liquid through. Please refer to FIG. 7 and FIG. 8. Besides the components mentioned above, the ball screw 10 in the embodiment further comprises a signal processing unit 600, a control unit 700, a memory unit 800 and an indication unit 900. The sensor 400, the signal processing unit 600, the control unit 700 and the memory unit 800 are electrically connected to each other, and the indication unit 900 is electrically connected to the control unit 700. When the ball screw 10 is activated (step S01), the coolant liquid flows in the flow channel C and generates the pressure correspondingly (step S02). At this time, the sensor 400 detects the pressure and outputs an original signal to the signal processing unit 600 (step S03). In the embodiment, the signal processing unit 600 comprises a signal amplifier and an analog-to-digital converter capable of amplifying the detected original signal by the sensor 400, sampling and converting the original signal to a digital signal for the following signal processing procedures. After the signal processing unit 600 receives the original signal and the processing and converting are completed, the signal processing unit 600 outputs the processed digital signal to the control unit 700 (step S04). At this time, the memory unit 800 stores the digital signal (step S05) to execute a more complete trace to the pressure or the flux of the coolant liquid.

In order to announce the user in time when an exception about the flux of the coolant liquid happens, the indication unit 900 in the embodiment determines a type of an indicating signal going to output according to a relationship between a predetermined signal $S_P$ determined by the system in advance and an error between the digital signal and the predetermined signal $S_P$ (step S06). When the error between the digital signal and the predetermined signal $S_P$ does not exceed a ±20% threshold of the predetermined signal $S_P$, i.e., an absolute value of the error is less than 20% magnitude of the predetermined signal $S_P$, it means the flux and the corresponding pressure of the coolant liquid are in a normal range. Then the control unit 700 controls the indication unit 900 to output a first indicating signal (step S07) such as a green light to announce the user that the current flux of the coolant liquid is in a normal state. When the error between the digital signal and the predetermined signal $S_P$ is from the 20% threshold to a 40% threshold or from the −20% threshold to a −40% threshold of the predetermined signal $S_P$, i.e., the absolute value of the error is from 20% to 40% magnitude of the predetermined signal $S_P$, it means there is a risk that the flux and the corresponding pressure of the coolant liquid are too much or too less. Then the control unit 700 controls the indication unit 900 to output a second indicating signal (step S08) such as a yellow light to announce the user that the current flux of the coolant liquid should be noted. When the error between the digital signal and the predetermined signal $S_P$ exceeds the ±40% threshold of the predetermined signal $S_P$, i.e., the absolute value of the error is greater than 40% magnitude of the predetermined signal $S_P$, it means that an exception about the flux and the corresponding pressure of the coolant liquid occurs. Then the control unit 700 controls the indication unit 900 to output a third indicating signal (step S09) such as a red light to announce the user that the current flux of the coolant liquid is in danger and should be handled or halted right away.

In summary, the ball screw of the present invention is able to detect the flux and the corresponding pressure of the coolant liquid in the flow channel instantly through disposing the sensor on the sealing member, and to convert the original signal to the digital signal for ease of processing. Besides, since the sensor, the sealing member and the cover simply stack, the sensor can be selected from a simple and sensitive sensor such as a piezoelectric sensor or a piezoresistive sensor to save the cost of manufacturing and increase the precision of detecting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A ball screw adapted to detecting coolant liquid comprising:
   a screw;
   a nut comprising a main body and an end surface, wherein a through-hole and a flow channel are disposed on the main body, the nut is threadedly disposed on the screw via the through-hole, a plurality of openings are disposed on the end surface, and the plurality of openings communicate with the flow channel;
   a plurality of sealing members disposed in the plurality of openings;
   a sensor disposed on a sealing member of the plurality of sealing members to detect a pressure of the coolant liquid and output an original signal;
   a signal processing unit electrically connected to the sensor to receive the original signal and convert the original signal to a digital signal; and
   a cover disposed on the sensor and fixed to the nut.

2. The ball screw of claim 1, wherein the sealing member further comprises a protruding portion, the sensor is disposed on the protruding portion.

3. The ball screw of claim 2, wherein an orthogonal projected area of the protruding portion on the cover is 60% to 70% of an orthogonal projected area of the sensor on the cover.

4. The ball screw of claim 1, further comprising a control unit and a memory unit, wherein the sensor, the signal processing unit, the control unit and the memory unit are electrically connected to each other, the signal processing unit outputs the digital signal to the control unit, and the memory unit stores the digital signal.

5. The ball screw of claim 4, further comprising an indication unit, wherein the indication unit is electrically connected to the control unit, when an error between the digital signal and a predetermined signal does not exceed a ±20% threshold of the predetermined signal, the indication unit outputs a first indicating signal; wherein when the error is from the 20% threshold to a 40% threshold or from the −20% threshold to a −40% threshold of the predetermined signal, the indication unit outputs a second indicating signal; wherein when the error exceeds the ±40% threshold of the predetermined signal, the indication unit outputs a third indicating signal.

6. The ball screw of claim 1, wherein the sensor is a piezoresistive sensor.

7. The ball screw of claim 1, wherein the plurality of sealing members are symmetrically arranged along a circumstantial direction of the nut, and a surface of the cover is coplanar with the end surface.

\* \* \* \* \*